United States Patent [19]
Giller et al.

[11] Patent Number: 5,336,453
[45] Date of Patent: Aug. 9, 1994

[54] METHOD FOR PRODUCING CERAMIC-BASED ELECTRONIC COMPONENTS

[75] Inventors: Russell S. Giller, Berlin; James D. Horrigan, Cheshire, both of Conn.

[73] Assignee: Aerospace Coating Systems, Inc., Berlin, Conn.

[21] Appl. No.: 75,683

[22] Filed: Jun. 11, 1993

[51] Int. Cl.$^5$ ............................................. C04B 35/46
[52] U.S. Cl. ........................................ 264/57; 264/58; 432/258; 432/259
[58] Field of Search ............... 264/57, 58; 432/258, 432/259

[56] References Cited

U.S. PATENT DOCUMENTS

| | | | |
|---|---|---|---|
| 2,711,975 | 6/1955 | Wainer et al. | 117/129 |
| 2,757,219 | 7/1956 | Clough et al. | 13/35 |
| 3,227,431 | 1/1966 | Steeves | 263/48 |
| 3,355,537 | 11/1967 | Troell et al. | 13/35 |
| 3,687,437 | 8/1972 | Fischer | 266/43 |
| 3,715,441 | 2/1973 | Collins | 13/26 |
| 4,146,670 | 3/1979 | Rogers | 432/258 |
| 4,159,891 | 7/1979 | Schmidt et al. | 432/264 |
| 4,259,061 | 3/1981 | Dubetsky | 432/258 |
| 4,399,194 | 8/1983 | Zelez et al. | 428/457 |
| 4,535,033 | 8/1985 | Stecura | 428/633 |
| 4,594,106 | 6/1986 | Tanaka | 106/1.12 |
| 4,749,629 | 7/1988 | Sarin et al. | 428/698 |
| 4,877,705 | 10/1989 | Polidor | 428/34.6 |

FOREIGN PATENT DOCUMENTS

| | | | |
|---|---|---|---|
| 53-123411 | 10/1978 | Japan. | |
| 2230084 | 9/1990 | Japan | 432/258 |
| 2222239 | 2/1990 | United Kingdom | 432/258 |

Primary Examiner—James Derrington
Attorney, Agent, or Firm—DeLio & Peterson

[57] ABSTRACT

A method of heat treating ceramic-based electronic components by providing a furnace fixture adapted to support the ceramic-based electronic components which is made from a substrate selected from the group consisting of silicon carbide (SiC), cordierite (2MgO.-2Al$_2$O$_3$.5SiO$_2$), mullite (3Al$_2$O$_3$.2SiO$_2$), stabilized zirconia, and alumina (Al$_2$O$_3$) containing a glassy bond phase. A cladding layer of zirconia is then deposited on the furnace fixture substrate by plasma deposition. The ceramic-based electronic component to be fired is placed on the zirconia-coated substrate; and heated to a desired temperature to heat treat the component.

19 Claims, 2 Drawing Sheets

METHOD FOR PRODUCING CERAMIC-BASED ELECTRONIC COMPONENTS

BACKGROUND OF THE INVENTION

1. Field of the Invention

This invention relates to a method and apparatus for producing ceramic-based electronic components, and more particularly to a particular combination of ceramic compositions useful for fixtures for heat treating such components.

2. Description of Related Art

Components in electronic circuitry utilize ceramic materials for both substrates and semiconductor packages. However, the most common type of ceramic-based electronic components for which the present invention is useful in heat treating are ceramic capacitors, resistors, terminators or the like which are typically made up of multiple layers of oxide or nonoxide ceramics having suitable dielectric properties. Common sizes are 0.08×0.05 in., 0.125×0.063 in. and 0.5×0.225 in. Multilayer ceramics are also used as substrates for integrated circuit packages. Alumina-based ceramics are widely employed, as well as mullite ($3Al_2O_3.2SiO_2$), beryllia (BeO), aluminum nitride (AlN) and various other well known glass-ceramic materials, depending on the dielectric constant, coefficient of thermal expansion, and other properties desired. Different classifications for ceramic dielectric materials are Class I dielectrics with low k (dielectric constant) values made by mixing magnesium titanate with calcium titanate; Class II dielectrics with high k values (also known as ferroelectrics) based on barium titanate, optionally with additions of barium stanate, barium zirconate or magnesium titanate; and Class III dielectrics.

In processing such ceramic-based electronic components, the parts in the "green" state are fired one or more times to temperatures of approximately 1000° C.–1700° C. and higher, more typically 1100° C.–1500° C., to achieve vitrification, sintering and/or densification. Total cycle times for heat treatment are typically eight (8) hours or longer, although shorter times may be used where there is only a small mass of product. Firing may be done under a vacuum or protective atmosphere but is typically done in air. Standard type furnaces or kilns employed in the industry are typically either the pusher or tunnel type and the periodic or batch type.

The devices or fixtures by which the ceramic components are physically supported during the firing process are generally termed furnace or kiln furniture. Other well known nomenclature is utilized for various configurations and types of fixtures such as saggets, setters, and plates, and varieties of substrates with rails or sidewalls. Processes used for manufacturing prior art monolithic furnace fixtures include press cast molding, powder roll compaction, tape casting, slip casting or extrusion of the green ceramics to the desired shape, followed by firing of these materials in the range of temperatures given previously. A wide variety of ceramic materials have been employed such as the aforementioned and other alumina and alumina-based ceramics, as well as zirconia. In some instances, powdered forms of these ceramics have been applied to furnace fixtures either as dry powders or aqueous washes which are then dried to leave a powder residue, to prevent sticking of the components to the fixture surface.

Although the prior art methods of using these monolithic furnace fixtures have not changed dramatically over the years, there has been a long sought need to reduce furnace time and associated energy costs to maximize productivity in processing ceramic-based electronic components. With some types of fixture materials, especially those which have low reactivity with typical ceramics used in electronics, this has been difficult because of the relatively thick fixture cross sections necessitated for purposes of maintaining strength and thermal shock resistance. In some instances, the fixture panels had high porosity and a rough surface, and were not considered mechanically suitable for use in thin, large panels which are desirable for maximizing the number of components which may be placed in the furnace. The result has been that a relatively large amount of furnace heat goes to heating the fixtures themselves, which not only costs more fuel but also penalizes the process by requiring longer heat up and cool down time for the combined mass of fixtures and electronic components. Ceramic materials which have greater strength, can be easily processed to flatness and other dimensional parameters, and can withstand cyclic exposure to high temperature firing such as alumina do not have the degree of chemical inertness needed for processing many of the variety of ceramics used in electronics, and therefore have only limited potential for use.

Bearing in mind the problems and deficiencies of the prior art, it is therefore an object of the present invention to provide a process for heat treating ceramic-based electronic components which reduces the time and energy required to fire the components, while at the same time providing a surface for contacting the component which is relatively inert so as to avoid chemical contamination of the ceramics employed in the components.

It is another object of the present invention to provide furnace fixtures for processing ceramic-based electronic components which have a relatively thin cross section while having a high degree of strength and resistance to thermal cycles at the temperatures and conditions employed in heat treating such components.

It is a further object of the present invention to provide furnace fixtures for processing ceramic-based electronic components which may be produced to close tolerances for flatness and other dimensional parameters.

It is yet another object of the present invention to provide a process for heat treating ceramic-based electronic components in which the furnace fixtures eliminate sticking of the components to the fixture surface and have a long working life.

It is a further object of the present invention to provide furnace fixtures for processing ceramic-based electronic components in which the total volume of fixture material is reduced and the volume of furnace space which is available for components to be heat treated is increased.

SUMMARY OF THE INVENTION

The above and other objects, which will be apparent to those skilled in the art, are achieved in the present invention which in one aspect relates to a method of heat treating ceramic-based electronic components by providing a furnace fixture adapted to support the ceramic-based electronic components which is made from a substrate selected from the group consisting of silicon carbide (SiC), cordierite ($2MgO.2Al_2O_3.5SiO_2$), mullite ($3Al_2O_3.2SiO_2$), stabilized zirconia, and alumina ($Al_2O_3$) containing a glassy bond phase. A cladding layer of zirconia is then deposited on the furnace fixture substrate by plasma deposition. The ceramicbased electronic component to be fired is placed on the zirconia-coated substrate and heated to a desired temperature to heat treat the component.

In another aspect, the invention relates to an apparatus for heat treating ceramic-based electronic components comprising a furnace and a furnace fixture having a substrate selected from the group consisting of silicon carbide (SiC), cordierite ($2MgO.2Al2O_3.5SiO_2$), mullite ($3Al_2O_3.2SiO_2$), stabilized zirconia, and alumina containing a glassy bond phase. The substrate is clad by a bonded layer of plasma-deposited zirconia, and the zirconia-clad fixture substrate supports the ceramic-based electronic component for firing.

The preferred substrate comprises a thin plate made from alpha alumina in an amount no greater than about 98% by weight of the substrate and at least about 2% by weight of an oxide of silicon or an alkali or alkaline earth metal, or combinations thereof. The cladding preferably comprises a smooth, impervious layer of stabilized cubic zirconia in a thickness of 0.0001–0.010 in.

DESCRIPTION OF THE PREFERRED EMBODIMENTS

The most common type of ceramic-based electronic component for which the present invention is useful in heat treating are ceramic capacitors which are typically made up of multiple layers of ceramics having suitable dielectric properties, although the invention may be utilized for processing any of the aforementioned types of electronic components and ceramic materials previously discussed in the background section of this application. The present invention is based on the discovery that improved furnace fixtures for heat treating ceramic-based electronic components, also known as "kiln furniture", may be produced by depositing a solid cladding layer of zirconia by plasma deposition in air over certain ceramic substrates. Such furnace fixtures are found to possess higher strength and better protection of the ceramic components (preventing sticking and contamination thereof) in smaller cross sections, which results in faster furnace and component heat-up rates and closer packing of components in the furnace, and which ultimately reduces the unit energy required to heat treat the ceramic-based electronic components.

For purposes of the present invention, the furnace fixture materials which have been found to be most desirable as substrates for the zirconia coating are: 1) silicon carbide (SIC); 2) cordierite ($2MgO.2Al_2O_3.5SiO_2$); 3) mullite ($3Al_2O_3.2SiO_2$); 4) zirconia stabilized with calcia, magnesia or yttria; and, preferably, 5) alumina ($Al_2O_3$) having alpha alumina crystals bound by a bond phase of silica ($SiO_2$) and/or other glassy oxides such as magnesia (MgO), calcia (CaO), sodium monoxide ($Na_2O$), ferric oxide ($Fe_2O_3$), zirconia ($ZrO_2$), or combinations of the above. The preferred alumina containing the glassy bond phase contains silica and has a composition of no greater than about 98% $Al_2O_3$, and at least about 2% silica and/or the other aforementioned oxides, and more preferably has a composition of 96% $Al_2O_3$ and 2.5–3.0% $SiO_2$. (Unless otherwise noted, all references herein to composition percentages are in weight percent of the total.) Higher amounts of silica, up to about 25%, in the preferred alumina substrate composition have been shown to provide good bonding with the plasma deposited zirconia, with no other adverse effects on manufacturing, operation and use of the invention. Additionally, zirconia ($ZrO_2$) may be added as a component to the preferred alumina containing the glassy bond phase to provide zirconia toughened alumina, also known as "ZTA", which may be employed as a substrate material for the furnace fixtures of the present invention. The addition of unstabilized zirconia provides toughness for resistance to shock in extended thermal cycles.

Processes used for manufacturing the furnace fixtures include molding, powder roll compaction, tape casting, slip casting or extrusion of the green ceramics to the desired plate-like shape, followed by firing of these materials, as described previously. These aforementioned preferred fixture substrate materials generally provide strong, thermally shock resistant platforms for the electronic components at base section thickness of less than 0.100 in., preferably 0.040–0.060 in., and at lengths and widths of 3–6 in. When stacked and separated by spacers, these relatively thin fixture plates maximize the volume available inside the furnace for the ceramic-based electronics products themselves, which can have thicknesses up to 0.025 in. and higher. Naturally, if desired for special applications, the fixture panels may be manufactured and used in the higher thickness employed in the prior art, typically up to 0.500 in. However, unlike the previously utilized monolithic panels of zirconia which typically required a thickness over 0.100 and up to 0.400 in. or more, and had high porosity and a rough surface, the substrate panels to be utilized in the present invention have relatively dense, smooth surfaces and are mechanically suitable for use in thin, large panels.

The zirconia to be plasma sprayed as the coating or cladding over the aforementioned fixture substrate materials is preferably stabilized to a cubic matrix by the addition of oxide stabilizers such as magnesia (MgO), calcia (CaO) yttria ($Y_2O_3$), lanthana ($La_2O_3$) and $Ce_2O_3$. The zircon ia to be plasma deposited is more preferably stabilized with magnesia and has a composition of approximately 76% $ZrO_2$ (unstabilized) and 24% MgO, although calcia- and/or yttria-stabilized zirconia are also believed especially useful. In the case where the zirconia is plasma sprayed over a zirconia substrate (manufactured as described previously), the zirconia coating contrasts with the substrate by its substantially increased density and smoother surface, as-deposited.

The preferred particle size of the zirconia is 140–325 U.S. Mesh, although other particle sizes may be utilized with different application equipment. As indicated, the stabilized zirconia is deposited on the ceramic furnace fixture substrate by plasma deposition, which is a well known process utilized in other industries. The plasma deposition may take place in air or in a protective or inert atmosphere. Prior to applying the plasma spray deposition, it is desirable to prepare the surface of the substrate by grit blasting to clean and roughen the surface to promote adhesion and bounding of the solid zirconia layer. Plasma deposition takes place by ionizing the carrier gas, adding zirconia powder and applying it by conventional plasma gun to a desired thickness inches at a predetermined traverse and feed rates. While any suitable thickness of zirconia may be utilized, such as up to 0.025 in or more, typically the zirconia topcoat layer may range from about 0.0001 to about 0.0100 in., preferably from about 0.0005 to about 0.035–0.0040 in., most preferably 0.0015 in. As-deposited the preferably stabilized zirconia provides a thin yet solid, smooth, essentially pore free, impermeable coating over desired areas of the fixture substrate material coming in contact with the ceramic components. The relatively inert zirconia cladding is especially useful in preventing contamination of the electronic components from the silica and the alumina in the silicon carbide, cordierite, mullite and preferred alumina substrates. For additional smoothness, the surface may be sanded with a light abrasive after plasma deposition.

The method and apparatus provided by the present invention stands in contrast with the prior art in which unstabilized or essentially pure zirconia or alumina flour was applied in either dry form or a wash over the surface of the monolithic ceramic materials described previously for furnace fixtures. In such prior art, the zirconia and alumina powders added nothing to the strength or properties of the furnace fixtures, and required reapplication after every use.

In operation, the ceramic-based electronic components are typically spaced single height on the zirconia-clad surface of the fixtures produced by the process of the present invention. These fixtures are then stacked one upon the other utilizing spacers, which may be integral rails on the fixtures or separate pieces. Preferably, the spacers themselves are zirconia clad to reduce sticking between adjacent pieces. The stacked components are then placed inside the furnace and heated to the firing temperature for a desired time. The heat treating temperatures of approximately 1000° C.–1700° C. used to fire the ceramic components, while sometimes being within the vitrification range of the particular ceramic, is below that at which the components become substantially molten. The particular combination of a relatively thin plasma deposited zirconia layer on a substrate of alumina having a glassy bond phase results in a heating rate that is considerably faster than if the same thickness of zirconia is utilized as the furniture fixture. At the thicknesses described herein, the zirconia coated substrate of alumina having the glassy bond phase will have a heating rate that is approximately 14 times higher than that of a monolithic zirconia plate of similar thickness. Where a zirconia-clad alumina plate of 0.060 in. thickness replaces a prior art plate of zirconia of 0.240 in. thickness, the heating rate will be more than 200 times faster.

While prior art fixtures such as monolithic zirconia in the relatively thick sections employed had good thermal shock resistance, believed to be due in part to the porosity present which arrests crack propogation, the alumina containing the glassy bond phase preferred as the fixture substrate of the present invention is believed to have comparable or better properties in this regard, despite having typically thinner (0.060 in.) sections and higher density. Furthermore, the bonding of the plasma-deposited zirconia to the substrates to be employed in the present invention is extremely strong so that a long working life of the zirconia-clad fixtures is expected. While not wishing to be bound by theory, it is believed that the presence of the thin glassy layers at the boundary of the alpha alumina crystals of the preferred composition of the present invention results in high thermal shock resistance, and that the thermally induced interface stresses between the zirconia coating and alumina substrate are negligible as a practical matter. Additionally, it is believed that these characteristics of the alumina containing a glassy bond phase results in a stronger bond between the zirconia layer and the alumina substrate. Bond strength of the zirconia is expected to be enhanced over time because of solid state diffusion expected along the zirconia/substrate interface. The possible presence of a spinel, generically designated as a structural group: $XY_2O_4$, and more commonly known as the mineral $MgO.Al_2O_3$ (or $MgAl_2O_4$), is believed to contribute to the favorable characteristics of the invention described herein.

Figure 1:
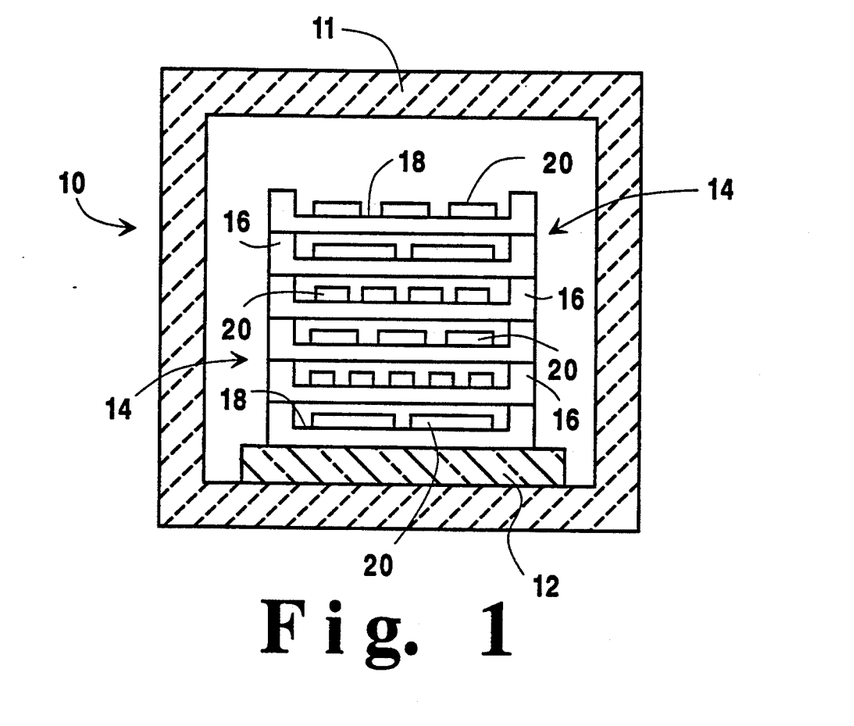
FIG. 1 is a side elevational view of the furnace apparatus of the present invention employing zirconia-clad furnace fixtures supporting ceramic-based electronic components for heat treatment.
Figure 2:
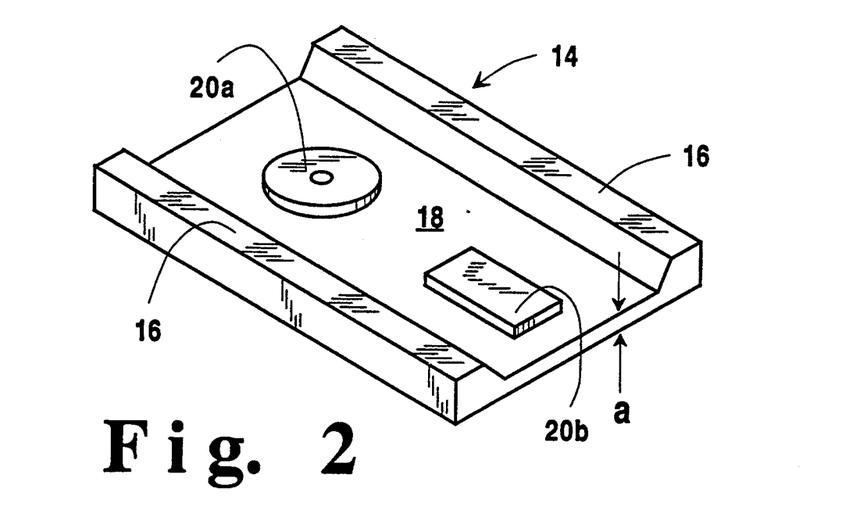
FIG. 2 is a perspective view of a zirconia-clad furnace fixture of FIG. 1 supporting ceramic-based electronic components.

With reference to the drawings, which are not necessarily shown to scale, FIG. 1 is a side elevational view of the furnace apparatus of the present invention employing zirconia-clad furnace fixtures supporting ceramic-based electronic components for heat treatment. Furnace 10 has a thermally insulative lining 11 and a base plate 12 of any desired refractory material for supporting the mass of fixtures and components. A plurality of zirconia-clad fixtures or setters 14 having integral side rails 16 are stacked upon each other within furnace 10. Disposed upon the fixture upper supporting surfaces 18 are a plurality of ceramic-based electronic components 20, which due to the greater height of rails 16, have sufficient space above and to the sides to prevent contact between one another and the lower surface of the fixture above. At least the flat upper supporting surface 18 of each fixture 14 is zirconia-clad to prevent chemical contamination of the components 20 by the fixture substrate material of the type described previously. As shown more clearly in FIG. 2, for maximum heating efficiency, the supporting surface thickness "a" of the fixture 14 is kept to a minimum, preferably below 0.100 in., more preferably 0.040–0.060 in., so as to maximize the mass of components 20a and 20b contained in a given internal volume of the furnace. The typical width and depth dimensions of the fixtures, on the order of 4–6 in., makes flatness of the fixture important at such thin sections.

Figure 3A:
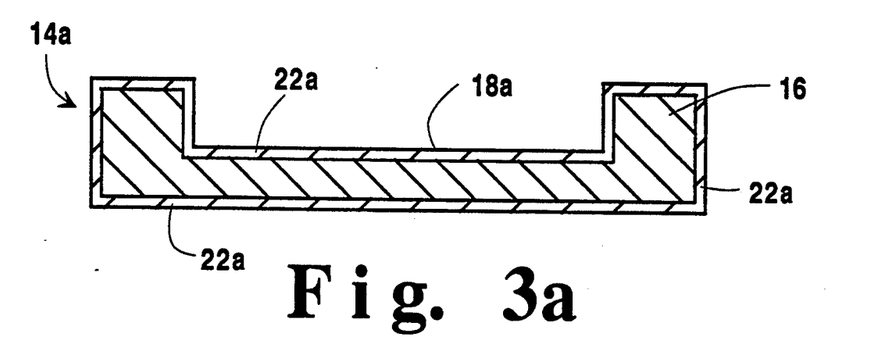
FIG. 3a is a cross-sectional view through a first embodiment of the furnace fixture of FIG. 2 showing the zirconia coating layer on all sides of the fixture.
Figure 3B:
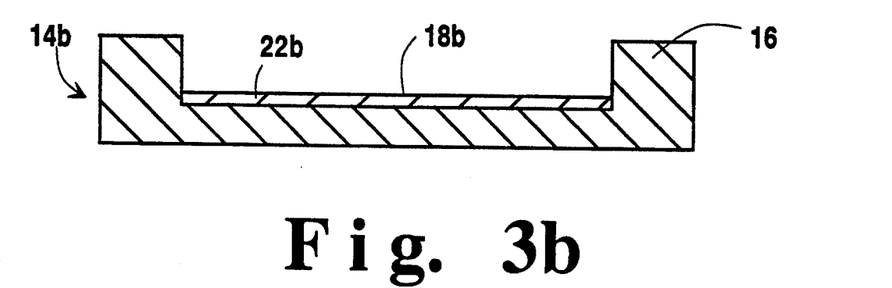
FIG. 3b is a cross-sectional view through a second embodiment of the furnace fixture of FIG. 2 showing the zirconia coating layer on only the upper component-supporting surface of the fixture.

Cross-sectional views of fixture 14 are shown in FIGS. 3a and 3b. In FIG. 3a, the zirconia is shown deposited on the supporting surface 18a and all other sides of the fixture, whereas in FIG. 3b the zirconia is shown deposited on only the supporting surface 18b, leaving the fixture substrate material exposed on the remaining sides. For maximum performance and life, all sides of the fixture substrate should be zirconia-clad.

Figure 4:
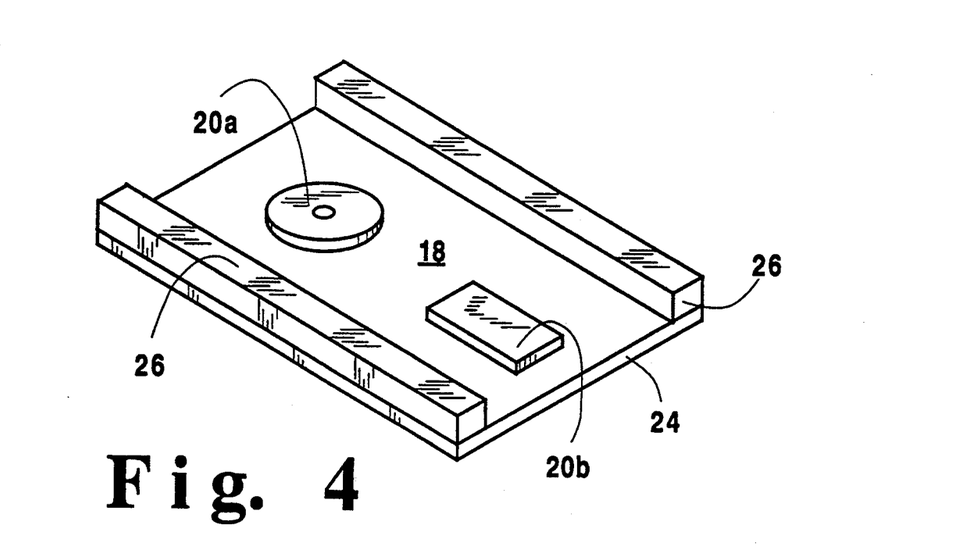
FIG. 4 is a perspective view of another zirconia-clad furnace fixture for supporting ceramic-based electronic components which employs separate spacer rails.

An alternate configuration of a furnace fixture is depicted in FIG. 4 in which a flat, rectangular, zirconia-clad fixture plate 24 supports components 20a and 20b on its supporting surface 18. Plate 24 employs separate rails or spacers 26 of 0.250 in. thickness to separate and support adjacent levels of fixtures. The ceramic-based electronic components generally have a thickness of under 0.250 in., but thicker spacers or rails are used for larger components. Fixtures of the type shown in FIGS. 2 and 4 may be stacked up to 30–50 levels high in a typical furnace having interior dimensions of 18 in. × 18 in. × 18 in.

EXAMPLE

As a non-limiting example of the present invention, a furnace fixture substrate, or "setter", comprised of a silica-containing alumina has a typical analysis as follows (in weight percent):

| | |
|---|---|
| $Al_2O_3$ | 96 |
| $SiO_2$ | 2.5–3.0 |
| MgO | 0.75–1.0 |
| CaO | 0.10–0.25 |
| $Na_2O$ | 0.05–0.10 max. |
| $Fe_2O_3$ | 0.03–0.05 |
| $ZrO_2$ | 0–0.05 |

This alumina has a glassy bond phase between alpha alumina crystals and is fabricated by casting or extrusion to a size of 4.5 × 4.5 in. and thickness of 0.060 in. The surface of the setter is then grit blasted with no. 220 aluminum oxide grit at an air pressure of 65 to 70 psi at a gun distance of 4 to 5 inches and angle of 90° to obtain an even matte finish, with concentration on edge areas to provide good bonding properties for the zirconia coating. Avoiding contact with the skin, the setter is then ready for plasma deposition of the zirconia powder, which, without further protection, should be performed within two (2) hours of surface preparation for best results.

The zirconia powder utilized is magnesia stabilized, i.e., with a composition of 76% $ZrO_2$ and 24% MgO. For applying the plasma coating, a Metco plasma system may be utilized in which the zirconia powder is dried by preheating to 170° F. ±25° F. and mixing for 15 minutes. The setter is mounted on a turntable and rotated during deposition. Plasma spraying is done at a power of 1000 Kw (70 volts DC, 500 amps) at a pressure of 100 psig and feed rate of 5 pph in an air atmosphere. The stabilized zirconia is deposited by the high energy plasma spray in one pass to a uniform thickness of approximately 0.0015 in., and within a range of 0.001–0.0035 in. The plasma coater alumina substrate is then rubbed lightly with 200 grit sandpaper to produce a smooth finish.

A ceramic-based electronic component is then placed on the plasma coated, zirconia-clad alumina setter and inserted into a conventional heat treating furnace and heated to a temperature of 1100°–1400° C. in air for 2 hours.

The finished plasma sprayed zirconia coating on the furnace fixture of alumina or other substrate allows users to benefit by zirconia's resistance to reaction and contamination which allows extended time between replacement and elimination or lessening of sticking problems with the ceramic-based components. The system of the present invention has been tested and proven reliable for ferrite and titanite ceramic components, including sensitive barium titanate components. Thinner cross sections of the composite zirconia-clad substrate may be utilized than with monolithic zirconia and with a greater flatness for increased furnace capacity. As compared to monolithic zirconia, the increased thermal conductivity of alumina body combined with the overall lower mass will yield a faster ramp up and down from firing temperatures.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the spirit and scope thereof, the appended claims therefore being entitled to a full range of equivalents.

Thus, having described the invention, what is claimed is:

1. A method of heat treating ceramic-based electonic components comprising barium titanate, said method comprising the steps of:
   a) providing a furnace fixture adapted to support ceramic-based electronic components comprising a substrate selected from the group consisting of silicon carbide (SiC), cordierite ($2MgO.2Al2O_3.5SiO_2$), mullite ($3Al_2O_3.2SiO_2$), stabilized zirconia, and alumina containing a glassy bond phase;
   b) depositing a cladding layer of zirconia on said furnace fixture substrate by plasma deposition;
   c) providing a ceramic-based electronic component comprising barium titanate;
   d) placing said ceramic-based electronic component on said zirconia-coated substrate; and
   e) firing said ceramic-based electronic component and zirconia-clad substrate to a desired temperature of at least about 1000° C. to heat treat said ceramic-based electronic component.

2. The method of claim 1 wherein said substrate comprises alumina in an amount no greater than about 98% by weight of said substrate and at least about 2% by weight of an oxide of silicon or an alkali or alkaline earth metal, or combinations thereof.

3. The method of claim 1 wherein said substrate comprises alumina in an amount no grater than about 98% by weight of said substrate, zirconia, and at least about 2% by weight of an oxide of silicon or an alkali or alkaline earth metal, or combinations thereof.

4. The method of claim 1 wherein said substrate comprises silicon carbide (SiC).

5. The method of claim 1 wherein said substrate comprises stabilized zirconia.

6. The method of claim 1 wherein said substrate comprises cordierite ($2MgO.2Al2O_3.5SiO_2$).

7. The method of claim 1 wherein said substrate comprise mullite ($3Al_2O_3.2SiO_2$).

8. The method of claim 1 wherein said cladding layer comprises stabilized cubic zirconia.

9. A method of heat treating ceramic-based electronic components comprising barium titanate, said method comprising the steps of:
   a) providing a furnace fixture adapted to support ceramic-based electronic components comprising a substrate selected from the group consisting of silicon carbide (SiC), cordierite ($2MgO.2Al2O_3.5SiO_2$), mullite ($3Al_2O_3.2SiO_2$), stabilized zirconia, and alumina containing a glassy bond phase, said substrate having deposited on at least a portion of a surface thereof a smooth, impermeable top cladding layer of plasma-deposited zirconia having a thickness of less than 0.010 in.;

b) providing a ceramic-based electronic component comprising barium titanate;

c) placing said ceramic-based electronic component on the zirconia-coated portion of said substrate; and d) firing sad ceramic-based electronic component and zirconia-clad fixture to a desired temperature of at least about 1000° C. to heat treat said ceramic-based electronic component.

10. The method of claim 9 wherein said substrate comprises alumina in an amount no greater than about 98% by weight of said substrate and at least about 2% by weight of an oxide of silicon or an alkali or alkaline earth metal, or combinations thereof.

11. The method of claim 9 wherein said substrate comprises silicon carbide (SiC).

12. The method of claim 9 wherein said substrate comprises stabilized zirconia.

13. The method of claim 9 wherein said substrate comprises cordierite ($2MgO.2Al_2O_3.5SiO_2$).

14. The method of claim 9 wherein said substrate comprises mullite ($3Al_2O_3.2SiO_2$).

15. A method of heat treating ceramic-based electronic components comprising barium titanate, said method comprising the steps of:

a) providing a furnace fixture adapted to support a ceramic-based electronic component comprising a substrate selected from the group consisting of silicon carbide (SiC), cordierite ($2MgO.2Al_2O_3.5SiO_2$), mullite ($2Al_2O_3.2SiO_2$), stabilized zirconia, and alumina containing a glassy bond phase, said substrate having deposited at least a portion of a surface thereof a cladding layer comprising plasma-deposited zirconia;

b) providing a ceramic-based electonic component comprising barium titanate;

c) placing said ceramic-based electronic component on the zirconia-coated portion of said substrate; and d) firing said ceramic-based electronic component and zirconia-clad fixture to a desired temperature of at least about 1000° C. to heat treat said ceramic-based electronic component.

16. The method of claim 15 wherein said substrate comprises silicon carbide and said cladding layer is substantially inert to said ceramic-based electronic component and consists essentially of stabilized zirconia.

17. The method of claim 15 wherein said substrate comprises cordierite and said cladding layer is substantially inert to said ceramic-based electronic component and consists essentially of stabilized zirconia.

18. The method of claim 15 wherein said substrate comprises zirconia and said cladding layer is substantially inert to said ceramic-based electronic component and consists essentially of stabilized zirconia.

19. The method of claim 15 wherein said substrate comprises alumina and said cladding layer is substantially inert to said ceramic-based electronic component and consists essentially of stabilized zirconia.

* * * * *

UNITED STATES PATENT AND TRADEMARK OFFICE
CERTIFICATE OF CORRECTION

PATENT NO. : 5,336,453
DATED : August 9, 1994
INVENTOR(S) : Giller et al.

It is certified that error appears in the above-identified patent and that said Letters Patent is hereby corrected as shown below:

Column 1, line 52: "saggets" should read -- saggers --.
Column 3, line 4: "ceramicbased" should read -- ceramic-based --.
Column 4, line 60: "zircon ia" should read -- zirconia --.
Column 7, line 48: "coater" should read -- coated --.

Column 9, line 11: "sad" should read -- said --.

Signed and Sealed this

Fifteenth Day of August, 1995

Attest:

BRUCE LEHMAN

Attesting Officer      Commissioner of Patents and Trademarks

REEXAMINATION CERTIFICATE (2959th)
United States Patent [19]
Giller et al.

[11] B1 5,336,453
[45] Certificate Issued Jul. 23, 1996

[54] METHOD FOR PRODUCING CERAMIC-BASED ELECTRONIC COMPONENTS

[75] Inventors: Russell S. Giller, Berlin; James D. Horrigan, Cheshire, both of Conn.

[73] Assignee: Connecticut Innovations, Incorporated, Rocky Hill, Conn.

Reexamination Request:
No. 90/003,732, Feb. 17, 1995

Reexamination Certificate for:
Patent No.: 5,336,453
Issued: Aug. 9, 1994
Appl. No.: 75,683
Filed: Jun. 11, 1993

Certificate of Correction issued Aug. 9, 1994.

[51] Int. Cl.$^6$ .................................................. C04B 35/46
[52] U.S. Cl. .................................... 264/57; 432/258
[58] Field of Search ............... 264/57, 58; 432/258, 432/259

[56] References Cited

U.S. PATENT DOCUMENTS

| | | | |
|---|---|---|---|
| 2,711,975 | 6/1955 | Wainer et al. | 117/129 |
| 2,757,219 | 7/1956 | Clough et al. | 13/35 |
| 3,227,431 | 1/1966 | Steeves | 263/48 |
| 3,355,537 | 11/1967 | Troell et al. | 13/35 |
| 3,687,437 | 8/1972 | Fischer | 266/43 |
| 3,715,441 | 2/1973 | Collins | 13/26 |
| 4,146,670 | 3/1979 | Rogers | 432/258 |
| 4,159,891 | 7/1979 | Schmidt et al. | 432/264 |
| 4,259,061 | 3/1981 | Dubetsky | 432/258 |
| 4,399,194 | 8/1983 | Zelez et al. | 428/457 |
| 4,535,033 | 8/1985 | Stecura | 428/633 |
| 4,540,676 | 9/1985 | Chu et al. | 501/138 |
| 4,594,106 | 6/1986 | Tanaka et al. | 106/1.12 |
| 4,738,885 | 4/1988 | Matsumoto | 428/64 |
| 4,749,629 | 7/1988 | Sarin et al. | 428/698 |
| 4,797,238 | 1/1989 | Rhodes et al. | 264/65 |
| 4,877,705 | 10/1989 | Polidor | 428/34.6 |
| 4,948,538 | 8/1990 | Wei et al. | 264/6 |
| 5,177,035 | 1/1993 | Gee et al. | 501/82 |

FOREIGN PATENT DOCUMENTS

| | | |
|---|---|---|
| 2612511 | 9/1988 | France . |
| 53-123411 | 10/1978 | Japan . |
| 58-028237 | 8/1984 | Japan . |
| 63-025487A | 2/1988 | Japan . |
| 2239173A | 9/1990 | Japan . |
| 2230084 | 9/1990 | Japan . |
| 4224172A | 8/1992 | Japan . |
| 2222239 | 2/1990 | United Kingdom . |

OTHER PUBLICATIONS

Repton K–623Z Technical Bulletin.
MarkeTech International Product List, Dec. 1990.

*Primary Examiner*—Christopher A. Fiorilla

[57] ABSTRACT

A method of heat treating ceramic-based electronic components by providing a furnace fixture adapted to support the ceramic-based electronic components which is made from a substrate selected from the group consisting of silicon carbide (SiC), cordierite ($2MgO.2Al_2O_3.5SiO_2$), mullite ($3Al_2O_3.2SiO_2$), stabilized zirconia, and alumina ($Al_2O_3$) containing a glassy bond phase. A cladding layer of zirconia is then deposited on the furnace fixture substrate by plasma deposition. The ceramic-based electronic component to be fired is placed on the zirconia-coated substrate; and heated to a desired temperature to heat treat the component.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–19 is confirmed.

New claims 20–38 are added and determined to be patentable.

20. The method of claim 15 wherein said substrate comprises mullite and said cladding layer is substantially inert to said ceramic-based electronic component and consists essentially of stabilized zirconia.

21. A method of heat treating ceramic-based electronic components comprising barium titanate comprising the steps of:
   a) providing a furnace fixture adapted to support said ceramic-based electronic components comprising a fixture substrate comprising silicon carbide (SiC) and a fixture cladding layer deposited on at least a portion of a surface of said silicon carbide and bonded thereto comprising a solid, essentially impermeable top coating of plasma-deposited zirconia, said cladding layer being essentially inert to said ceramic-based electronic component;
   b) providing a ceramic-based electronic component comprising barium titanate;
   c) placing said ceramic-based electronic component on the zirconia-coated portion of said substrate; and
   d) firing said ceramic-based electronic component and zirconia-clad substrate to a temperature of at least 1000° C. to heat treat said ceramic-based electronic component.

22. The method of claim 21 wherein said cladding layer consists essentially of stabilized zirconia.

23. The method of claim 22 wherein said cladding layer has a thickness of less than 0.010 in.

24. A method of heat treating ceramic-based electronic components comprising barium titanate comprising the steps of:
   a) providing a furnace fixed adapted to support said ceramic-based electronic components comprising a fixture substrate comprising cordierite ($2MgO \cdot 2Al_2O_3 \cdot 5SiO_2$) and a fixture cladding layer deposited on at least a portion of a surface of said cordierite and bonded thereto comprising a solid, essentially impermeable top coating of plasma-deposited zirconia, said cladding layer being essentially inert to said ceramic-based electronic component;
   b) providing a ceramic-based electronic component comprising barium titanate;
   c) placing said ceramic-based electronic component on the zirconia-coated portion of said subtrate; and
   d) firing said ceramic-based electronic component and zirconia-clad substrate to a temperature of at least 1000° C. to heat treat said ceramic-based electronic component.

25. The method of claim 24 wherein said cladding layer consists essentially of stabilized zirconia.

26. The method of claim 25 wherein said cladding layer has a thickness of less than 0.010 in.

27. A method of heat treating ceramic-based electronic components comprising barium titanate comprising the steps of:
   a) providing a furnace fixture adapted to support said ceramic-based electronic components comprising a fixture substrate comprising mullite ($3Al_2O_3 \cdot 2SiO_2$) and a fixture cladding layer deposited on at least a portion of a surface of said mullite and bonded thereto comprising a solid, essentially impermeable top coating of plasma-deposited zirconia, said cladding layer being essentially inert to said ceramic-based electronic component;
   b) providing a ceramic-based electronic component comprising barium titanate;
   c) placing said ceramic-based electronic component on the zirconia-coated portion of said substrate; and
   d) firing said ceramic-based electronic component and zirconia-clad substrate to a temperature of at least 1000° C. to heat treat said ceramic-based electronic component.

28. The method of claim 27 wherein said cladding layer consists essentially of stabilized zirconia.

29. The method of claim 28 wherein said cladding layer has a thickness of less than 0.010 in.

30. A method of heat treating ceramic-based electronic components comprising barium titanate comprising the steps of:
   a) providing a furnace fixture adapted to support said ceramic-based electronic components comprising a fixture substrate comprising stabilized zirconia and a fixture cladding layer deposited on at least a portion of a surface of said stabilized zirconia and bonded thereto comprising a solid, essentially impermeable top coating of plasma-deposited zirconia, said cladding layer being essentially inert to said ceramic-based electronic component;
   b) providing a ceramic-based electronic component comprising barium titanate;
   c) placing said ceramic-based electronic component on the zirconia-coated portion of said substrate; and
   d) firing said ceramic-based electronic component and zirconia-clad substrate to a temperature of at least 1000° C. to heat treat said ceramic-based electronic component.

31. The method of claim 30 wherein said cladding layer consists essentially of stabilized zirconia.

32. The method of claim 31 wherein said cladding layer has a thickness of less than 0.010 in.

33. A method of heat treating ceramic-based electronic components comprising barium titanate comprising the steps of:
   a) providing a furnace fixture adapted to support said ceramic-based electronic components comprising a fixture substrate comprising alumina containing a glassy bond phase and a fixture cladding layer deposited on at least a portion of a surface of said alumina containing a glassy bond phase and bonded thereto comprising a solid, essentially impermeable top coating of plasma-deposited zirconia, said cladding layer being essentially inert to said ceramic-based electronic component;

b) providing a ceramic-based electronic component comprising barium titanate;

c) placing said ceramic-based electronic component on the zirconia-coated portion of said substrate; and d) firing said ceramic-based electronic component and zirconia-clad substrate to a temperature of at least 1000° C. to heat treat said ceramic-based electronic component.

34. The method of claim 33 wherein said cladding layer consists essentially of stabilized zirconia.

35. The method of claim 34 wherein said cladding layer has a thickness of less than 0.010 in.

36. The method of claim 33 wherein said substrate comprises alumina in an amount no greater than about 98% by weight of said substrate and at least about 2% by weight of an oxide of silicon or an alkali or alkaline earth metal, or combinations thereof.

37. The method of claim 36 wherein said cladding layer consists essentially of stabilized zirconia.

38. The method of claim 37 wherein said cladding layer has a thickness of less than 0.010 in.

* * * * *